United States Patent
Peng

[11] Patent Number: 5,912,535
[45] Date of Patent: Jun. 15, 1999

[54] DRIVING CIRCUIT FOR AN ELECTRIC LUMINESCENT PANEL INCLUDING FIRST AND SECOND DRIVING CIRCUITS

[75] Inventor: Wen Chi Peng, Taipei, Taiwan

[73] Assignee: Semisilicon Technology Corp., Taepei, China

[21] Appl. No.: 08/768,921

[22] Filed: Dec. 18, 1996

[51] Int. Cl.$^6$ ................................................. H05B 37/00
[52] U.S. Cl. ..................... 315/169.3; 315/171; 315/172
[58] Field of Search .......................... 315/169.3, 209 R, 315/219, 224, 226, 164, 172, 174, 171, 283, 287, 167

[56] References Cited

U.S. PATENT DOCUMENTS

| | | | |
|---|---|---|---|
| 5,172,032 | 12/1992 | Alessio | 315/169.3 |
| 5,502,357 | 3/1996 | Kimball | 315/209 R |

*Primary Examiner*—Don Wong
*Assistant Examiner*—David H. Vu
*Attorney, Agent, or Firm*—Smith, Gambrell & Russell, LLP; Beveridge, DeGrandi, Weilacher & Young

[57] ABSTRACT

A circuit driving electric luminescent panel in which the high potential contact of electric luminescent panel is connected to two parallel connected transistors of which the emitter of the first transistor is connected to a current—resisting coil and the positive pole of a diode in order to raise the voltage at the contact of the electric luminescent panel. The first transistor provides, within the time when the signal at its base is low, a negative voltage to increase the peak value-to-peak value voltage across the electric luminescent panel and its luminosity as well. Furthermore, another kind of design concept is presented with which the timing impulse of controlling signals while operation can be governed with its duty to control current consumption.

4 Claims, 6 Drawing Sheets

DRIVING CIRCUIT FOR AN ELECTRIC LUMINESCENT PANEL INCLUDING FIRST AND SECOND DRIVING CIRCUITS

BACKGROUND OF THE INVENTION

The present invention is a modification on Taiwan Utility Model Patent Application No. 84216630 "Modification On Circuit Structure Driving Electric Luminescent Panel" (now is withdrawn). This prior application is directed to simplifying outer parts through processing high voltage IC and achieving the same or even better luminosity by means of a different circuit structure of less current consumption.

FIG. 1 is a diagram showing the prior driving circuit of the application No. 84216630.

In the prior application No. 84216630, an electric luminescent panel has been described consisting of two transistors, a diode and a current-limiting inductance connected to the electric luminescent panel. By the signal produced by one of the two transistors connected to the current-limiting inductance to drive the electric luminescent panel, the other transistor is then driven so that the electric luminescent panel is alternately charged and discharged to urge the panel to give off light.

With continuous research into the problem, it is found that the results of this prior device isn't the best although the circuit structure of it is able to stimulate electric luminescent panel to shine. Thus comes the present invention.

SUMMARY OF THE INVENTION

It is therefore a primary object of the present invention to provide a circuit driving electric luminescent panel in which the high potential contact of electric luminescent panel is connected to two parallel connected transistors of which the collector of the first transistor is connected to a current-resisting coil and the negative pole of a diode in order to raise the voltage at the contact of the electric luminescent panel. The first transistor provides, within the time when the signal at its base is low, a negative voltage to increase the peak value-to-peak value voltage across the electric luminescent panel and its luminosity as well. Furthermore, the duty cycle of the driving signals frequency can control the power consumption of the circuit.

BRIEF DESCRIPTION OF THE DRAWINGS

The present invention can be best understood from the following detailed description of the preferred embodiments by referring to the accompanying drawings, wherein FIG. 1 is a chart showing the circuit driving electric luminescent panel of the prior application No. 84216630 case wherein

FIG. 4 is a circuit diagram showing the driving circuit formed by replacing the mechanical switching elements in FIG. 3 with electronic elements, while

DETAILED DESCRIPTION OF THE PREFERRED EMBODIMENT

Figure 1:
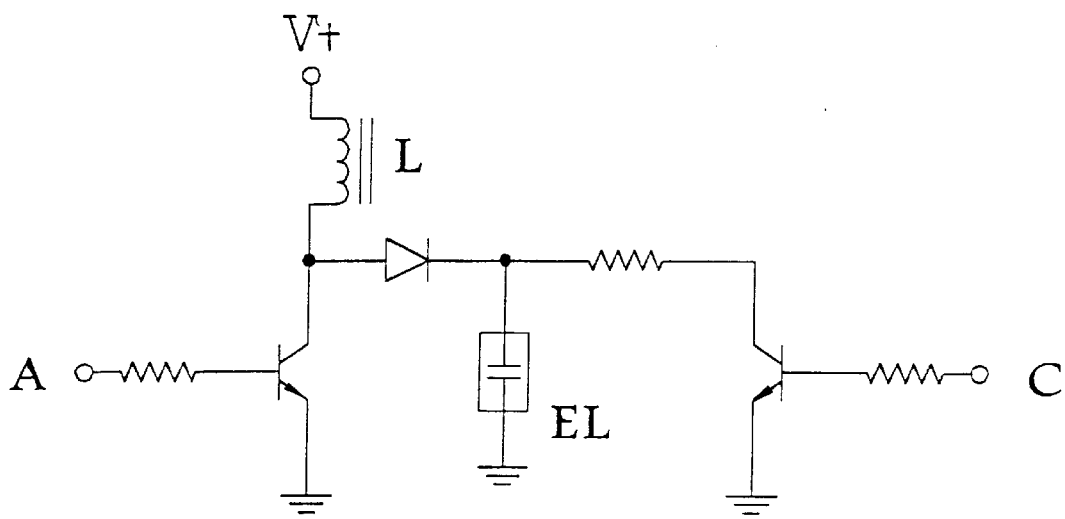
Figure 1A:
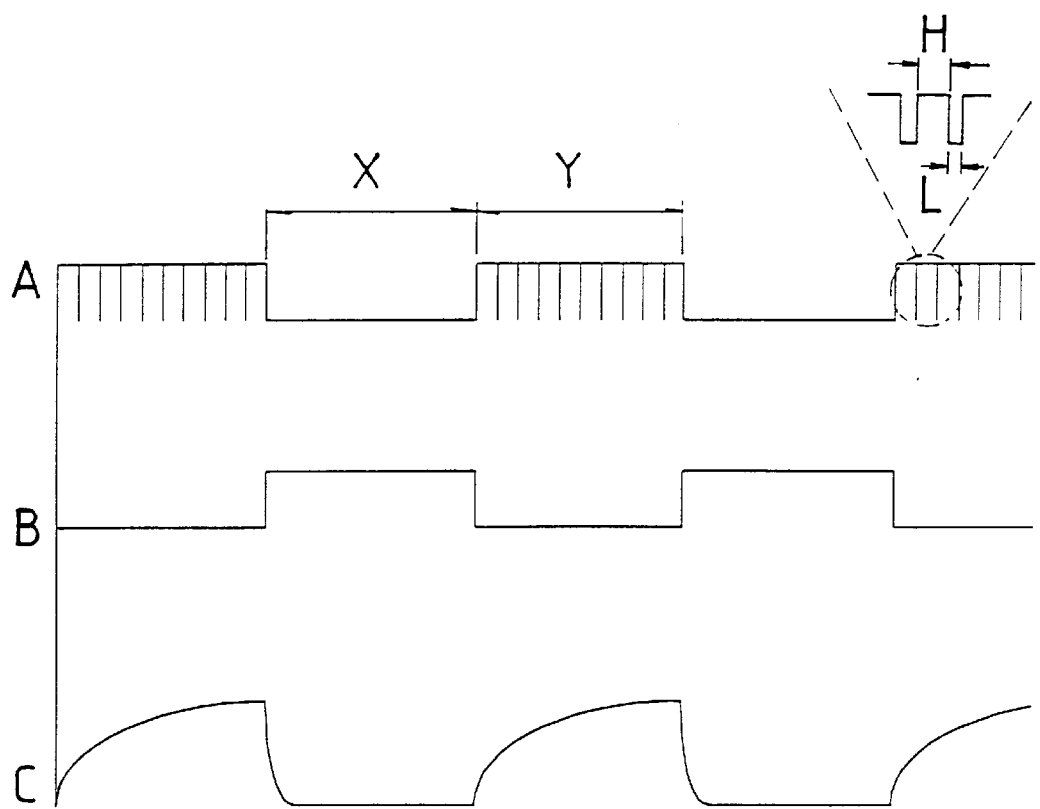
FIG. 1A shows the wave-forms at corresponding contacts.

FIG. 1 shows a driving circuit of the prior application wherein high voltage alternating (positive) signals are produced at point C. Electric luminescent panel is very sensitive to voltage, the higher the voltage, the brighter the light.

Certainly, the circuit in FIG. 1 could be modified by shortening time X and increasing time Y, and it is sure that voltage at C could be further heightened. However, there is a drawback in its nature, i.e. it is related to the inverse voltage-resistance of the diode and the transistor, and when the negative voltage is higher than that, the diode and transistor could sustain breakdown. Consequently, the value of voltage is limited and the consumption of current increases. In view of this, it is considered in the present invention that an additional negative voltage created in X region could increase peak value vs peak value of voltage across EL panel so that its luminosity may become brighter.

Figure 2:
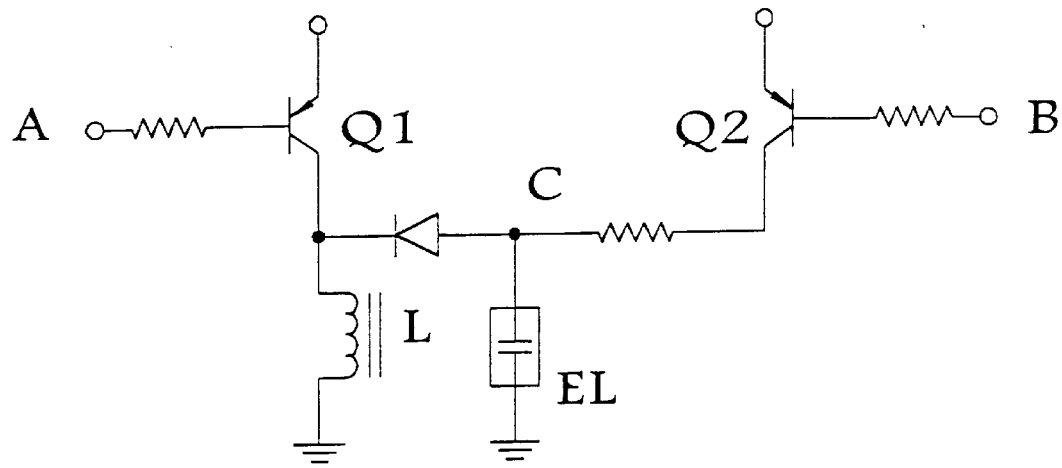
FIG. 2 is a diagram showing the driving circuit that creates high negative voltage.
Figure 2A:
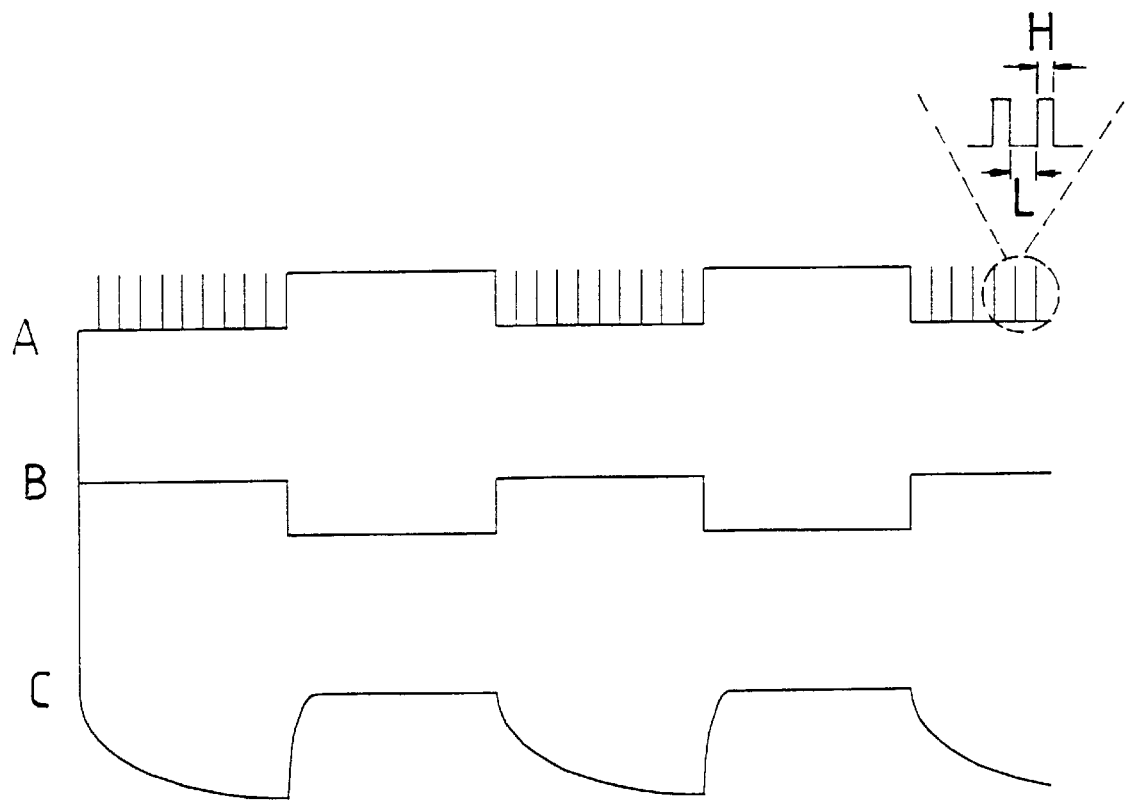
FIG. 2A shows the wave-forms at corresponding contacts.

The structure in FIG. 2 shows a practical example of the circuit of the present invention in which the high voltage contact C of EL panel is connected to transistors Q1 and Q2 in parallel. The collector of transistor Q1 is connected to a choke (current-resisting coil) L and the negative pole of diode D to increase voltage at EL contact C. Transistor Q2 provides a negative voltage, to increase peak-to-peak voltage on EL panel and its luminosity as well within the period, when the signal at base A of transistor Q1 is low. From the circuit it is proved that high negative voltage could be achieved and the principle is the same as that of FIG. 1.

Figure 3:
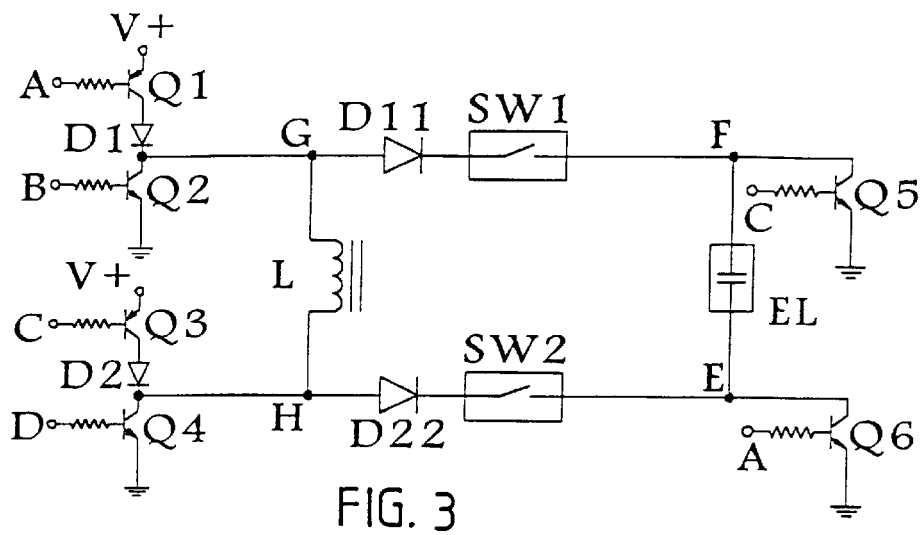
FIG. 3 is a circuit diagram showing the driving circuit based on another design concept of the invention.
Figure 3A:
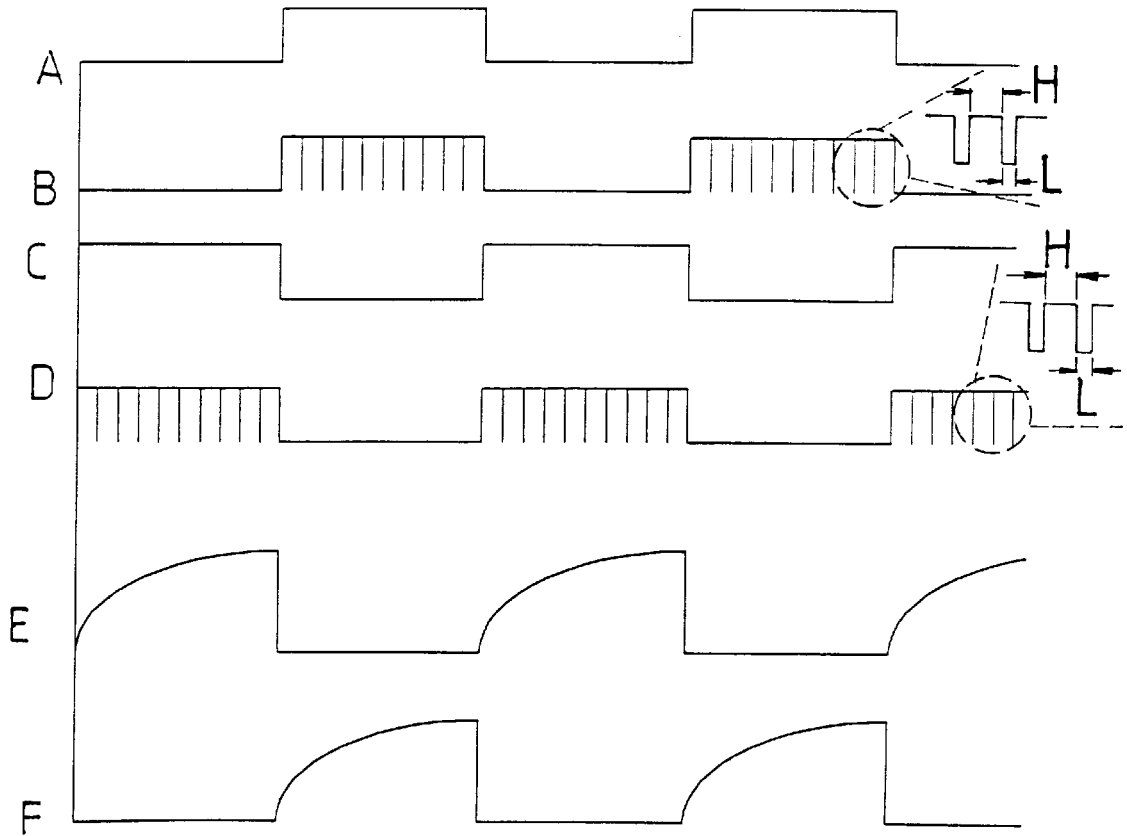
FIG. 3A shows the wave-forms at corresponding contacts.

The circuit shown in FIG. 3 is based on another design concept of the present invention with which the same object can be obtained. Specifically, contacts F and E of EL panel are connected to a driving circuit respectively. In the first driving circuit transistors Q1 and Q2 are connected in series with diode D1 put in between connecting the collector of transistor Q1 and the collector of transistor Q2. The negative pole of diode D1 is connected to the positive pole of another diode D11 and choke L, while the negative pole of diode D11 is connected to the collector of the fifth transistor Q5 and contact F of EL panel by way of switching element SW1. In the second driving circuit the third and fourth transistors Q3 and Q4 are connected in series with diode D2 put in between connecting the collector of transistor Q3 and the collector of transistor Q4. The negative pole of diode D2 is connected to the positive pole of another diode D22 and the other end of choke L, while the negative pole of diode D22 is connected to the collector of the sixth transistor Q6 and contact E of EL panel through switching element SW2. The driving circuit in FIG. 3 is based on the principle that the high voltage of positive pole alternately acts on both ends E and F of EL panel to create a practical potential difference VE–VF across both ends of EL panel. Comparing the wave-forms in FIG. 3A, it is seen that the expected object is successfully achieved. Similarly, the same effect could be obtained with high negative voltage acting on both ends of El panel alternately.

Figure 4:
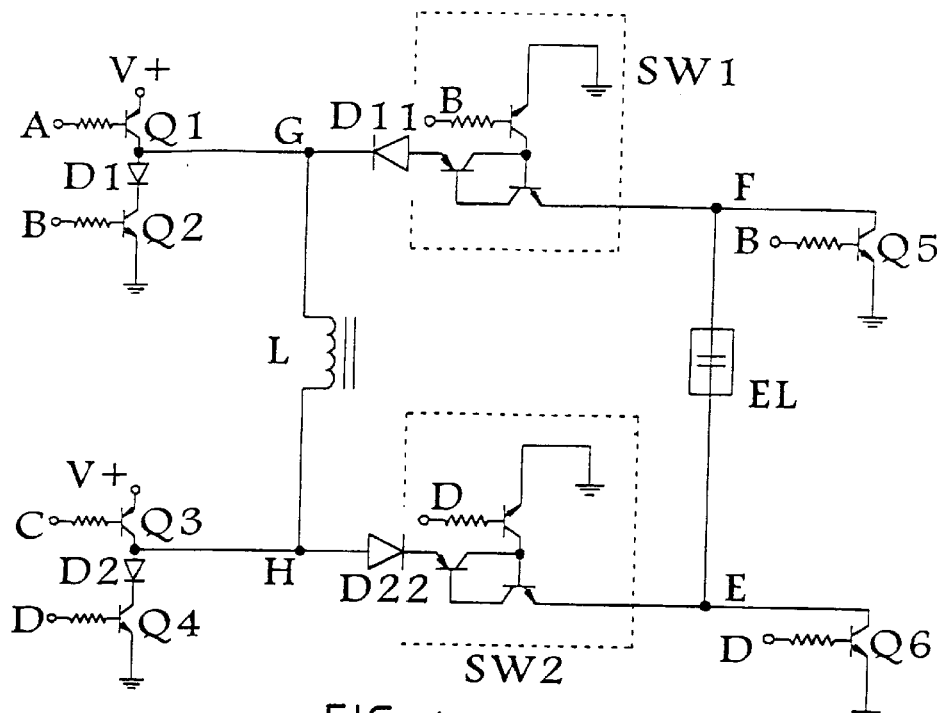

FIG. 4 is a circuit diagram showing the driving circuit formed by replacing the switching elements in FIG. 3 with electronic elements.

Figure 4A:
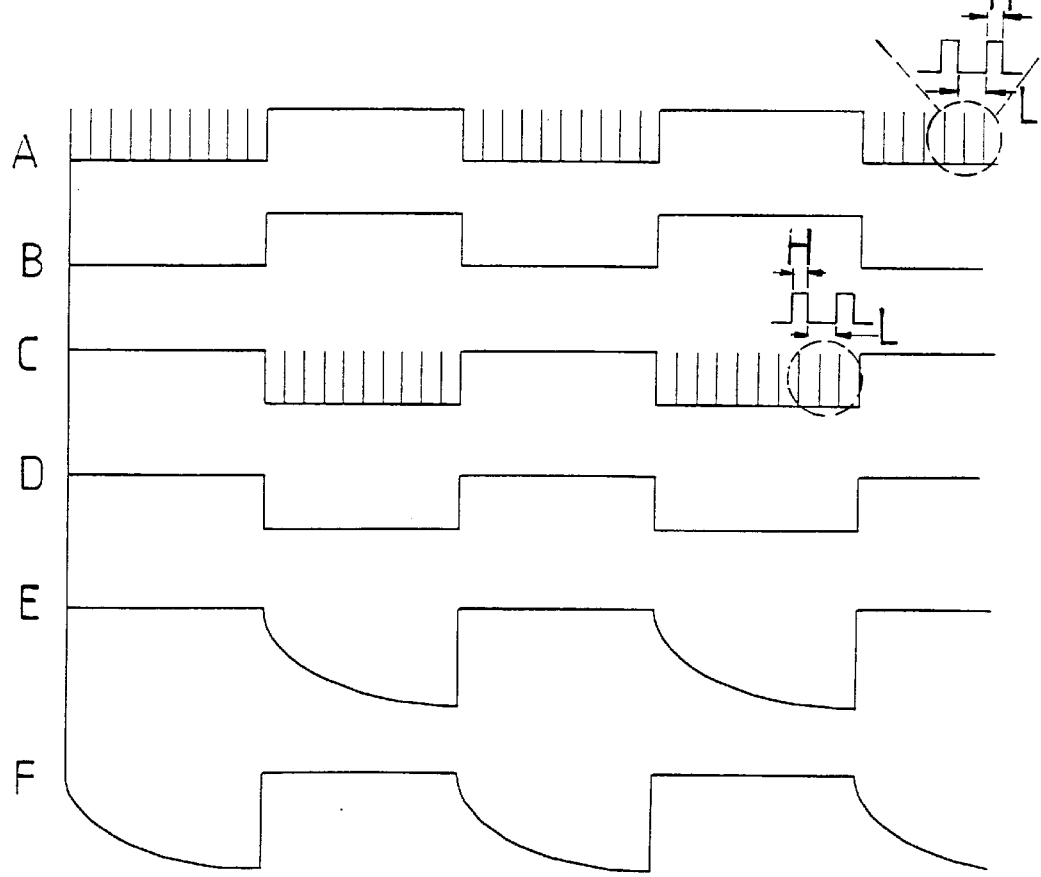
FIG. 4A is a wave diagram showing the wave-forms at corresponding contacts.

FIG. 4A is a wave diagram showing the wave-forms at corresponding contacts.

The switching timing impulse on operation of all controlling signals of the structure mentioned above as that at A in FIGS. 1–2, at B and D in FIG. 3, and at A and C in FIG. 4 can be governed with its duty ratio to control current consumption. For example, in FIG. 3A, when in one cycle, if H gets larger (compared with L getting smaller, "H" and "L" mean the duty ratio "high level signal" and "low level signal" respectively), the conduct time of the transistor is getting longer (such as Q2 and Q4 in FIG. 3), and the circuit's current consumption will be worse (more current consumption). By the method of the invention, if the duty ratio of switching timing impulse is varied, the circuit's current consumption will be changed. In other word, the duty ratio of switching timing impulse is controlled and the whole circuit current consumption can be controlled. Thus, the current consumption of the circuits can be controlled if the duty ratio (A of FIGS. 1–2, B and D of FIG. 3, A and C of FIG. 4, A of FIG. 5, A of FIG. 6) is under control. However, the less the current consumption is, the shorter the time of electrical conduct of Q2 and Q4 will be and the efficiency of the electric induction will also be limited. As a result, the brightness of the El panel will be affected. Diodes D1 and D2 in FIG. 3 can not be omitted, that is mainly because when transistor Q1 is conducting and transistor Q4 functions as a switching transistor (at this time Q2 and Q3 are under close status, see FIG. 3A), high voltage impulse signal will occur at both G and H. Without D1 transistor Q1 presents a PNP-type transistor and impulse signal higher than voltage at contact A and PN conducting voltage will lead to conduction of transistor Q1 through terminals B and C and through terminal B and E of Q1 further to V+ (V BEO of general purpose transistor isn't high generally, just around 5V) through contacts B and E, namely, the high voltage impulse signal will be clamped by V+, and as a result, very high voltage (more than 60V) can not produce at F. However, when diode D1 is added, the reverse breakdown voltage will increase so that the problem is resolved.

Similarly, diode D2 functions as diode D1 does. The function of transistors Q5 and Q6 mainly lies in discharge, when voltage at contact E or F rises to peak value, it is discharged by the diode so that an alternating signal is formed. Please consult the waveforms shown in FIG. 3A.

In view of the description above, the foregoing structure is considered to be a comparatively successful achievement.

By means of process of high-voltage-resistant IC (Bipolar or CMOS), it could be made integrated and minimized, and functional modifications, such as attachments of delaying device and flashing lights in a single IC, are sure to make the invention applicable to various kinds of product. Likewise, switching elements SW1 and SW2 (mechanical switch) in FIG. 3 can be replaced by electronic elements to accomplish the object of transformation into IC completely and reduce size, as shown by the replacing circuit in FIG. 4.

Figure 5:
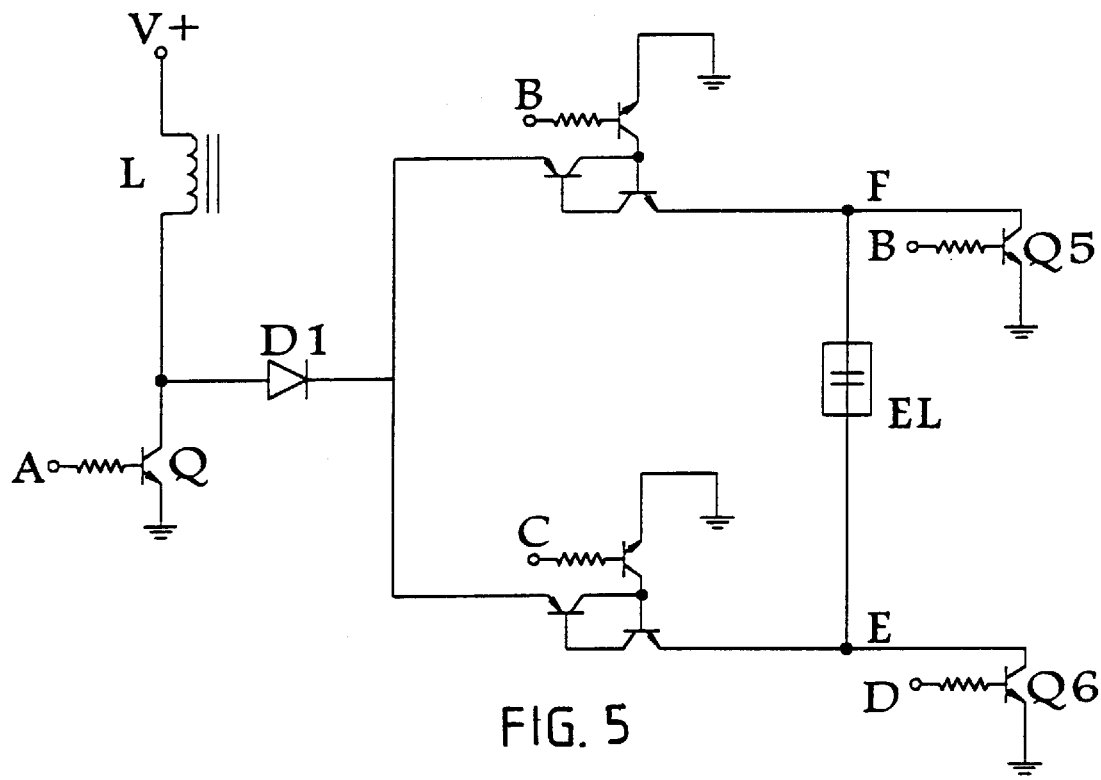
FIG. 5 shows the simplified driving circuit of that of FIG. 4 with one transistor combining a series of related elements into one.
Figure 6:
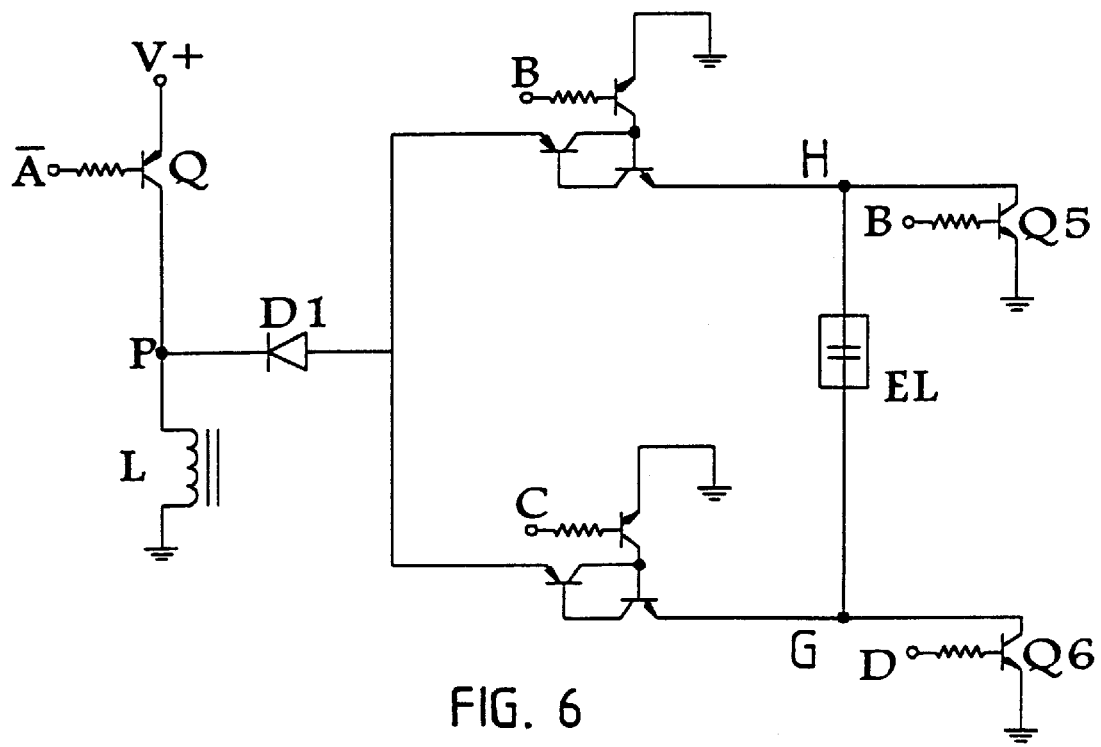
FIG. 6 shows another simplified kind of driving circuit of that of FIG. 4 constructed by one transistor.
Figure 7:
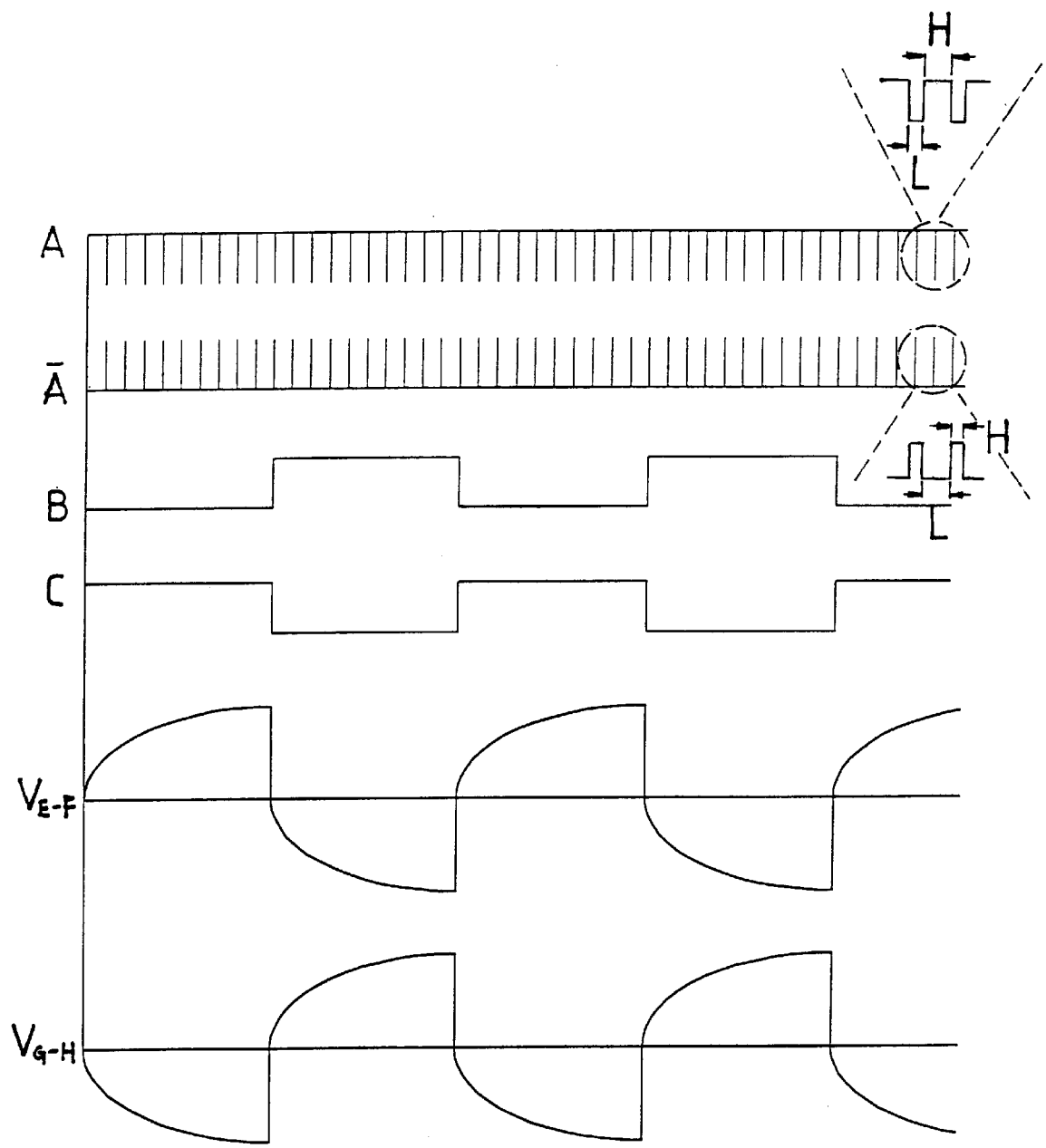
FIG. 7 is a wave diagram showing the wave-forms at corresponding contacts in FIGS. 5 and 6.

The circuit presented in FIG. 5 is a simplified one of that in FIG. 3 wherein the first and second transistors Q1 and Q2, the first diode D1, the third and fourth transistors Q3 and Q4, and the second diode D2 are simplified comprehensively into one transistor Q of which the collector is connected to a choke L and then connected to the above-mentioned two switching circuit breakers through diode D. While the circuit provided by FIG. 6 is one in which a transistor Q is used to replace the elements mentioned above with its collector connected to a choke and further connected to the above-mentioned two switching circuit breakers.

What is claimed is:

1. A driving circuit for driving an electric luminescent panel wherein both contacts of the electric luminescent panel are connected to the driving circuit, the driving circuit comprising:

a first driving circuit; and a second driving circuit, wherein the first driving circuit includes a first transistor (Q1) and a second transistor (Q2) connected in series a first diode (D1) connected between the collector of said first transistor (Q1) and the collector of said second transistor (Q2), and the negative pole of said first diode (D1) is connected to the positive pole of another diode (D11) and a current-resisting coil while the negative pole of said diode (D11) is connected to a first switch (SW1), to the collector of a fifth transistor (Q5) and to the electric luminescent panel, and the second driving circuit includes third and fourth transistors (Q3) and (Q4) connected in series with a second diode (D2) connected between the collector of the third transistor (Q3) and the collector of the fourth transistor (Q4), the negative pole of said diode (D2) is connected to another diode (D22) and the other end of said current-resisting coil while the negative pole of said diode (D22) is connected to the collector of a sixth transistor (Q6) and the electric luminescent panel through a second switch (SW2).

2. The driving circuit according to claim 1, wherein said first and said second switches each are constructed by electronic elements.

3. The driving circuit according to claim 1, wherein said first and said second transistors (Q1) and (Q2), said first diode (D1), said third and fourth transistors (Q3) and (Q4), and said second diode (D2) are simplified into one transistor whose collector is connected to said current-resisting coil and to the first and second switches through a diode positive terminal.

4. The driving circuit according to claim 1, wherein said first and said second transistors (Q1) and (Q2), said first diode (D1), said third and fourth transistors (Q3) and (Q4), and said second diode (D2) are simplified into one transistor, a collector of said transistor is connected to said current-resisting coil and to the first and second switches through a diode negative terminal.

* * * * *